US008920092B2

(12) United States Patent
D'Addario et al.

(10) Patent No.: US 8,920,092 B2
(45) Date of Patent: Dec. 30, 2014

(54) ROTATABLE END PIN FOR INSTRUMENT STRAP

(75) Inventors: James D'Addario, Old Westbury, NY (US); Robert O. Miller, Deer Park, NY (US)

(73) Assignee: D'Addario & Company, Inc., Farmingdale, NY (US)

( * ) Notice: Subject to any disclaimer, the term of this patent is extended or adjusted under 35 U.S.C. 154(b) by 259 days.

(21) Appl. No.: 13/443,082

(22) Filed: Apr. 10, 2012

(65) Prior Publication Data

US 2012/0260475 A1 Oct. 18, 2012

Related U.S. Application Data

(60) Provisional application No. 61/517,346, filed on Apr. 18, 2011.

(51) Int. Cl.
*F16B 43/00* (2006.01)

(52) U.S. Cl.
USPC ........................... 411/371.2; 411/396; 84/327

(58) Field of Classification Search
USPC ............... 411/371.2, 7, 372.5, 396, 397, 401, 411/546, 347–349; 84/327; 24/635, 586.11, 24/590.1, 591.1, 578.14, 615, 628
See application file for complete search history.

(56) References Cited

U.S. PATENT DOCUMENTS

| | | | | | |
|---|---|---|---|---|---|
| 1,104,204 | A * | 7/1914 | MaCormack | 24/581.11 |
| 1,723,972 | A * | 8/1929 | Gustav | 24/590.1 |
| 3,548,705 | A * | 12/1970 | Nasser | 411/80.1 |
| 4,711,596 | A * | 12/1987 | Bruderer | 403/348 |
| 6,540,463 | B2 * | 4/2003 | Ward | 411/173 |
| 2007/0059123 | A1 * | 3/2007 | Tangeman et al. | 411/553 |

* cited by examiner

*Primary Examiner* — Gary Estremsky
(74) *Attorney, Agent, or Firm* — Alix, Yale & Ristas, LLP

(57) ABSTRACT

An end pin has a composite shoulder with a fixed lower half and a rotatable upper half. The halves are alignable in a first, installation mode of minimal footprint relative to the hole and slit in the end piece to permit the pin to be easily inserted through the hole in the end piece. The upper half is rotated into a second, locking mode that increases the footprint of the pin over the hole and slit, thereby preventing inadvertent disengagement of the strap from the pin.

9 Claims, 3 Drawing Sheets

ROTATABLE END PIN FOR INSTRUMENT STRAP

RELATED APPLICATION

This application claims the benefit under 35 U.S.C. §109 (e), of U.S. Provisional Application No. 61/517,346 filed Apr. 18, 2011 for "Rotatable End Pin for Instrument Strap".

BACKGROUND

The present invention relates to attachments for securing a strap to an instrument such as a guitar or the like.

Musicians, particularly guitar players, often use a strap to suspend the instrument from their bodies in order to play while standing. The strap typically has end pieces made from leather or similar semi-rigid materials. Each end piece has a stamped hole and contiguous slot that is designed to slip over an end pin that rigidly projects from the guitar body. Over time, due to both the weight of the instrument and the repeated application and removal of the strap, the stamped hole can become distorted and enlarged. When this occurs, the end piece can slip off of the pin, disengaging the strap from the instrument and causing the instrument to fall to the floor, resulting in damage.

SUMMARY

The unintended slipping of the end piece from the end pin is greatly reduced or eliminated by our novel end pin, which attaches to the instrument strap in such a way that removal is quite difficult if not impossible unless deliberate steps are taken by the player.

We disclose an end pin that has a composite top or shoulder with a fixed half and a rotatable half such that the halves are alignable in a first, installation mode of minimal footprint relative to the hole and slit while the pin is inserted through the hole in the end piece, whereupon one half is rotated into a second, locking mode that increases or maximizes the footprint relative to the hole and slit.

In the first mode the strap can be easily attached to the instrument, and then easily locked in the second mode by applying rotation to a portion of the pin. This creates a very wide surface area contact areas between pin and strap end. The enlarged contact area prevents the pin from inadvertently slipping back through the stamped hole and slot in the strap end.

One embodiment is directed to an end pin unit for attachment to a musical instrument body, comprising a lower pin member forming a lower shoulder; an upper pin member forming an upper shoulder; a screw for attaching one of the pin members in fixed orientation on a musical instrument body; and a rotatable connection between the upper and lower pin members. The shoulder of one pin member can be alternately rotated into a first mode in which the upper and lower shoulders are oriented to permit attachment of the end strap and a second mode in which the upper and lower shoulders are aligned differently, to prevent detachment of the end strap.

In one preference, the screw has a head and a threaded shank and the lower pin member has a central bore for threadably receiving the screw shank and thereby assuming a fixed orientation relative to the instrument body when the screw is threaded into the body. Thus, the upper shoulder is rotatable relative to the fixed lower shoulder.

In another preference, the rotatable connection includes detents for alternately holding the shoulders in the first and second modes.

The method embodiment is directed to a first mode, characterize by passing a slotted opening of the end piece over a composite shoulder of the end pin so that the composite shoulder protrudes above the end piece, followed by a second mode in which one portion of the composite shoulder remains fixed, while another portion of the composite shoulder is rotated. In the second mode the total area of the shoulder portions that face the end piece, is larger than the total area of the shoulder portions that face the end piece in the first mode, thereby trapping the end piece beneath the shoulders.

BRIEF DESCRIPTION OF THE DRAWING

The preferred embodiment will be described in more detail with reference to the accompanying drawing, in which.

DETAILED DESCRIPTION

Figure 1:
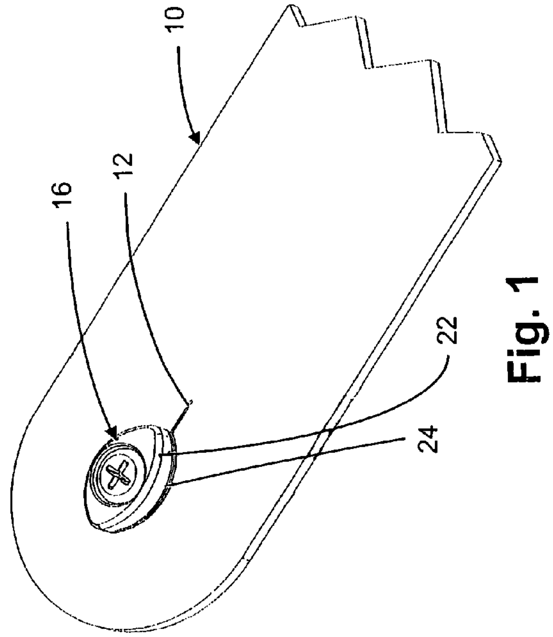
FIG. 1 is an oblique view of the pin configured in a first mode, for slipping through the slit into the hole of the guitar strap end piece.
Figure 2:
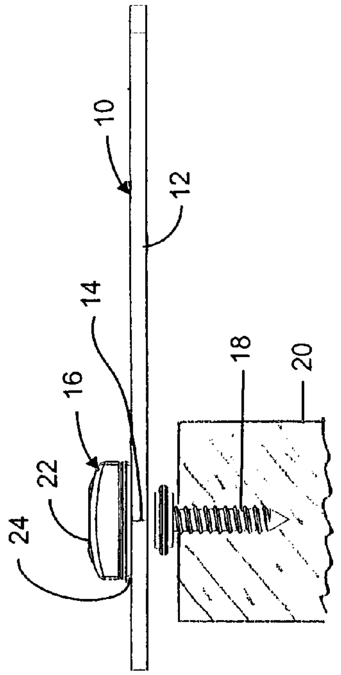
FIG. 2 is a section view of the configuration of pin and end strap in the first mode shown in FIG. 1.

FIGS. 1 and 2 show one embodiment in the first mode, whereby the end piece 10 of an instrument strap has a longitudinal slot 12 and a hole or transverse slot 14 through which the pin 16 is attached to the strap. The pin 16 has a screw portion 18 by which the pin is permanently mounted to the guitar body as represented at 20. In the first mode, upper 22 and lower 24 pin members each form laterally or radially oblong (e.g., elliptical) shoulders that are congruently aligned on the upper surface of the end piece 10 with their major axes along the longitudinal slot 12. This minimizes the footprint of the pin 16, for facilitating passage of the slots 12, 14 over the pin.

Figure 3:
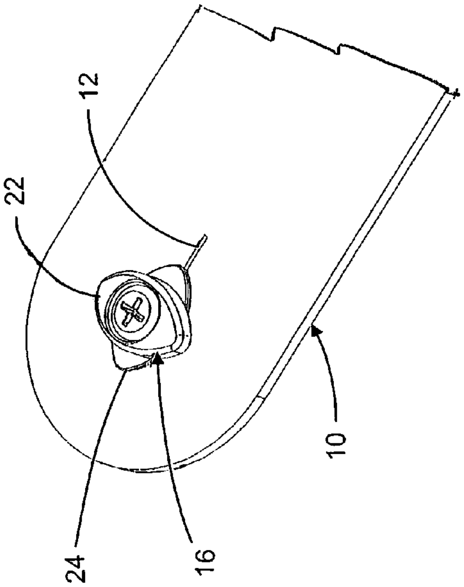
FIG. 3 is an oblique view similar to FIG. 1, showing the pin in a second mode, configured to prevent removal from the strap.
Figure 4:
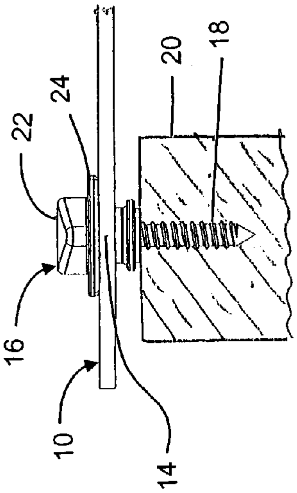
FIG. 4 is a section view of the configuration of pin and end strap in the second first mode shown in FIG. 3.

FIGS. 3 and 4 show a second mode associated with FIGS. 1 and 2, whereby the upper pin member 22 has been rotated 90 degrees. This places the upper shoulder into a transverse orientation relative to the shoulder of the lower pin member 24 (i.e., transverse to the longitudinal slot 12). This produces an overall crossing ("+" or "X") configuration of plural pin members 22, 24 that maximizes the footprint of the pin facing the upper surface of the end piece 10.

As shown in FIGS. 5-8, the pin assembly or unit 16 contains a wood screw 18 for attaching the unit 16 to the instrument 20. Preferably, a non rotatable lower pin half or member 24 has a small diameter through bore that threadably receives the screw shank whereby the lower pin member 24 can be fixed relative to the screw 18 and the instrument body. A radially inner region has four small indentations or detents 26, each at 90 degrees to the next. The upper pin half or member 22 has a through bore and a radially inner region that has four protrusions 28, also at 90 degrees, that match the detents 26 in the lower half 24. Once the unit 16 is assembled, the upper part 22 can rotate about a cylindrical boss 30 at the entrance to the bore in the lower pin half 24. An annular wave spring washer 32 in the assembled pin 16, provides tension between the screw head 34 and the rim of a counter bore or recess 36 that accepts the screw head 34 in the upper half 22. A soft annular washer 38 sits between the lower half 24 and the instrument body 20 to protect the instrument finish.

The boss or protrusion 30 in the lower half passes through (e.g., radially inwardly of the rim of) the upper half counterbore 36 to a point slightly proud of the bottom or rim of the counterbore. This forms a rotatable joint between the upper 22 and lower 24 pin members. The wave washer 32 is placed around the boss 30, and rests on the counterbore face and extends above the boss 30 at its uppermost points. The screw 18 is passed through both upper and lower halves 22, 24 and screwed to the instrument until the screw head 34 abuts the lower half boss 30. At this stage the spring 32 is slightly compressed, applying force between screw head 34 and counterbore 36, holding the upper half protrusions 28 into the lower half detents 26. There is still enough "play" for the washer 32 to be compressed into a flat shape.

Figure 11:
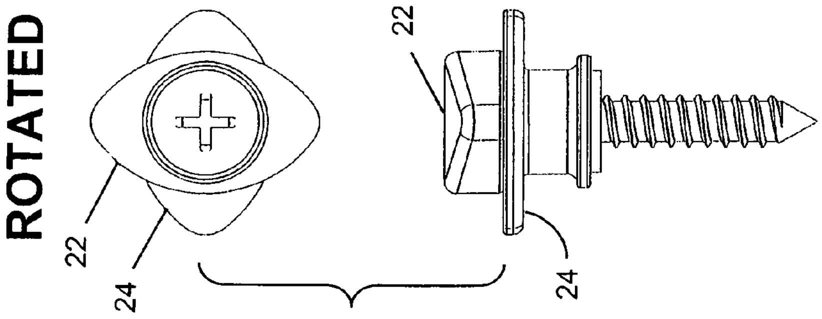
FIGS. 9-11 illustrate the rotation of the upper portion of the pin during installation on the strap end piece.
Figure 10:
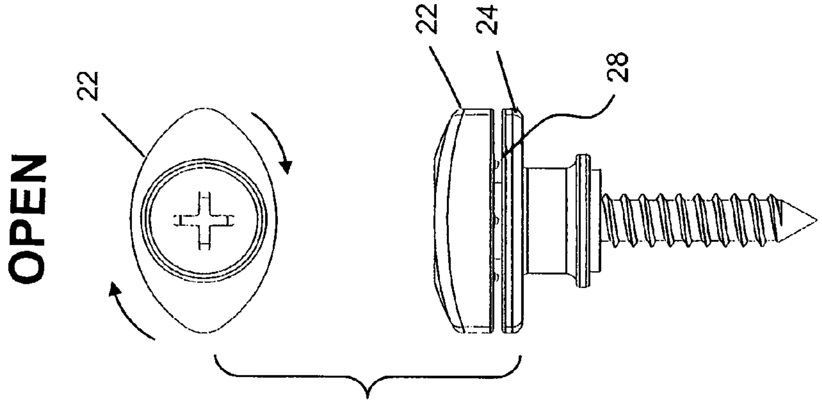
Figure 9:
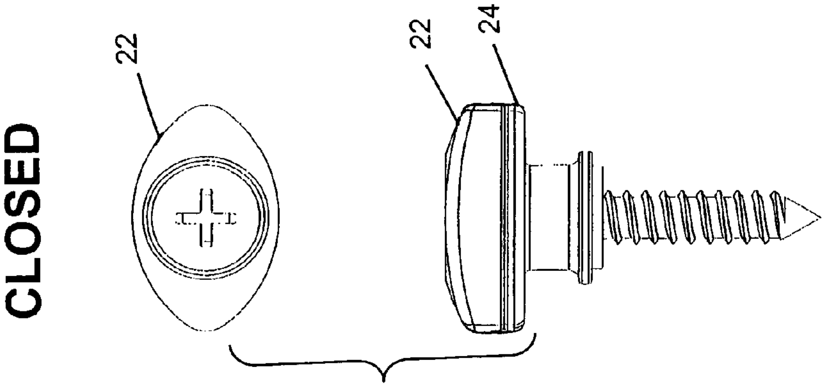

The installation procedure will be described with reference to FIGS. 1-4 and 9-11. The user attaches the end piece 10, passing the compound, elliptically shaped pair of shoulders of the pin 16 through the stamped hole and slots 12, 14 in the end piece 10 (FIGS. 1, 2 and 9). The upper pin half 22 is then rotated about the center axis by hand, forcing the protrusions 28 out of the detents 26. The wave washer 32 is now mostly flat, applying the maximum force between screw head 34 and counterbore 36. (FIG. 10). When the upper pin half 22 reaches 90 degrees of rotation the washer 32 forces the protrusions 28 back into the matching set of detents 26. The washer 32 then relaxes to its original state, still applying some tension to the upper half counterbore 36 which holds the upper half in place. (FIGS. 3, 4, and 11). The pin is now in a cross shape, and the resulting added surface area creates a condition where the strap end piece cannot inadvertently be removed from the pin.

Reversing the rotation procedure realigns the upper and lower halves 22, 24 to the installation configuration (FIGS. 1, 2, 5, and 9) so the strap end piece can be disengaged from the pin 16.

In a general way, the procedure can be summarized as first, passing a slotted opening 12, 14 of the end piece 10 over a composite shoulder 22, 24 of the end pin unit 16 so that the composite shoulder protrudes above the end piece. While one shoulder 24 remains fixed, another portion 22 of the composite shoulder is rotated, whereby after rotation the total footprint area of the transversely oriented composite portions that directly face downwardly toward the end piece (i.e. the radially outer areas of 22 and 24), is larger that the total footprint area of the composite portions that directly face downward toward the end piece immediately after the end piece is passed over the composite shoulder (i.e., only the area of member 24).

In the illustrated embodiment, the lower pin member 24 has a centerline, the shoulder on the lower pin member is oblong and symmetrical about that centerline, and likewise the upper pin member 22 has the same centerline (axis of rotation) and the shoulder on the upper pin member is oblong and symmetrical about that common centerline. The shoulders are identical in a somewhat lens shape and when oriented in the first mode the congruent shoulders also form a larger lens shape. In the second mode the shoulders are transverse.

Both members should have a substantially circular central area where at least four quadrilaterally symmetric detents and protrusions (e.g., 26 and 28) can be engaged and disengaged via relative rotation of the upper and lower shoulders. The cross section views of FIGS. 7 and 8 illustrate these central areas, but the peripheries of the shoulders can be different so long as when aligned in the installation mode the footprint is small enough to slip over the hole and/or slot 12, 14 in the strap end piece 10.

Figure 8:
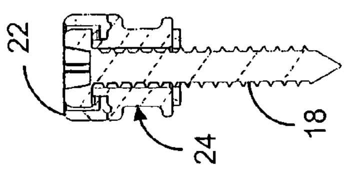
FIG. 8 is a longitudinal section view of the pin in the second mode.
Figure 7:
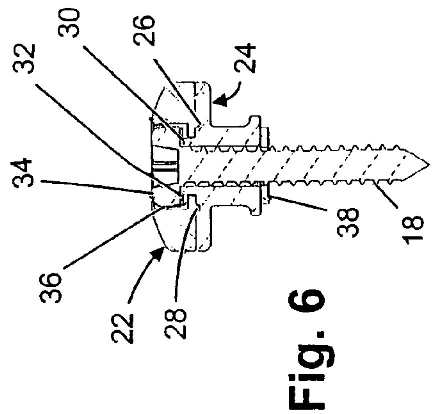
FIG. 7 is a longitudinal section view of the pin in the first mode.
Figure 6:
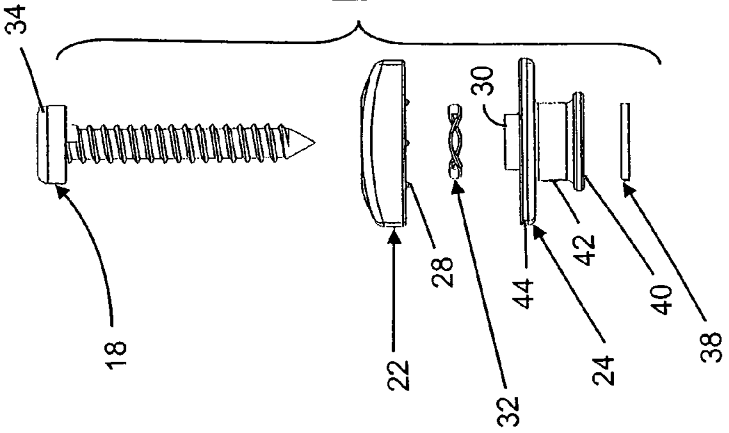
FIG. 6 is an exploded view of the pin shown in FIG. 5.
Figure 5:
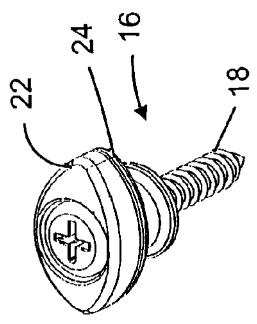
FIG. 5 is an oblique view of the pin shown in FIGS. 1-4, according to the first mode, before engage with the end strap.

In the preferred embodiment of the lower member 24 shown in FIGS. 6-8, a lower, foot portion 40 rests directly or indirectly on the instrument body, a cylindrical pedestal portion 42 rises to an oblong, preferably elliptical shoulder portion 44, which surrounds the upwardly projecting boss 30. In the preferred embodiment of the upper member 22, the counterbore 36 defines a recess having a sidewall which rotatably accommodates the head 34 of the screw and an annular rim that rotatably accommodates the boss 30.

It should be appreciated, however, that other shapes for the upper and lower pin members 22, 24 and associated shoulders are possible within the spirit and scope of the invention. For example, the fixed, lower pin member 24 can have a more conventional, round top defining an annular shoulder, while the rotatable, upper pin member can be oblong as shown at 22.

The invention claimed is:

1. An end pin unit for attachment to a musical instrument body and adapted to secure a slotted end piece of a strap to said body, comprising:

a lower pin member forming a lower shoulder;

an upper pin member forming an upper shoulder;

a screw for attaching one of the pin members in fixed orientation on a musical instrument body; and a rotatable connection between said one and the other pin member whereby the shoulder of the other pin member can be alternately rotated into a first mode wherein the upper and lower shoulders are aligned in a first relative orientation such that the slot can be manually passed downwardly over both of the aligned shoulders and thereby positioned beneath both shoulders and a second mode wherein the upper and lower shoulders are aligned in a different, second orientation above the slot, preventing the slot from passing upwardly over the shoulders; wherein the screw has a head and a threaded shank;

the lower pin member has a pedestal portion below the lower shoulder and a central bore for threadably receiving the screw shank, whereby the screw is attachable through the lower pin member and pedestal portion to the instrument body, thereby assuming a fixed orientation of the lower shoulder relative to the instrument body when the screw is threaded into the body; and the end piece rests on the pedestal when the slot is below both shoulders.

2. The end pin of claim 1, wherein the lower pin member has a centerline and the shoulder on the lower pin member is oblong and symmetrical about said centerline;

the upper pin member has said same centerline and the shoulder on the upper pin member is oblong and symmetrical about said centerline.

3. The end pin of claim 2, wherein the shoulders are identical in shape and when oriented in said first mode the shoulders are congruent.

4. An end pin unit for attachment to a musical instrument body and adapted to secure a slotted end piece of a strap to said body, comprising:

a lower pin member forming a lower shoulder;

an upper pin member forming an upper shoulder;

a screw for attaching one of the pin members in fixed orientation on a musical instrument body; and a rotatable connection between said one and the other pin member whereby the shoulder of the other pin member can be alternately rotated into a first mode wherein the upper and lower shoulders are aligned in a first relative orientation such that the slot can be manually passed downwardly over both of the aligned shoulders and thereby positioned beneath both shoulders and a second mode wherein the upper and lower shoulders are aligned in a different, second orientation above the slot, preventing the slot from passing upwardly over the shoulders;

wherein the screw has a head and a threaded shank and the lower pin member has a central bore for threadably receiving the screw shank and thereby assuming a fixed orientation relative to the instrument body when the screw is threaded into the body; and the rotatable connection includes detents for alternately holding the shoulders in the first and second modes.

5. The end pin of claim 4, wherein the detents are provided between the upper and lower pin members, and a spring is situated between the head of the screw and the lower pin member, whereby when the screw is threaded into the body the head of the screw loads the spring against the upper pin member and biases the detents toward engagement between the upper and lower pin members.

6. An end pin unit for attachment to a musical instrument body and adapted to secure a slotted end piece of a strap to said body, comprising:

a lower pin member forming a lower shoulder;

an upper pin member forming an upper shoulder;

a screw for attaching one of the pin members in fixed orientation on a musical instrument body; and a rotatable connection between said one and the other pin member whereby the shoulder of the other pin member can be alternately rotated into a first mode wherein the upper and lower shoulders are aligned in a first relative orientation such that the slot can be manually passed downwardly over both of the aligned shoulders and thereby positioned beneath both shoulders and a second mode wherein the upper and lower shoulders are aligned in a different, second orientation above the slot, preventing the slot from passing upwardly over the shoulders;

further comprising the instrument, wherein the lower pin member has a substantially cylindrical pedestal portion including a bottom;

the screw is attached through the lower pin member to the instrument body whereby the pedestal portion bears directly or indirectly on and is fixed with respect to the instrument body;

a strap end piece has a slit straddling the pedestal portion of the lower pin member beneath the shoulder of the lower pin member; and the upper shoulder has an oblong shoulder and is in said second mode, oriented transversely to the slit.

7. The end pin of claim 6, wherein the rotatable connection includes detents for alternately holding the shoulders in the first and second modes.

8. An end pin unit for attachment to a musical instrument body and adapted to secure a slotted end piece of a strap to said body, comprising:

a lower pin member forming a lower shoulder;

an upper pin member forming an upper shoulder;

a screw for attaching one of the pin members in fixed orientation on a musical instrument body; and a rotatable connection between said one and the other pin member whereby the shoulder of the other pin member can be alternately rotated into a first mode wherein the upper and lower shoulders are aligned in a first relative orientation such that the slot can be manually passed downwardly over both of the aligned shoulders and thereby positioned beneath both shoulders and a second mode wherein the upper and lower shoulders are aligned in a different, second orientation above the slot, preventing the slot from passing upwardly over the shoulders; wherein the lower pin member has a substantially cylindrical pedestal portion including a bottom for bearing directly or indirectly on the instrument body, a top hub portion from which the shoulder extends laterally and a central bore extending through the hub and pedestal portion for receiving the screw shank;

the upper pin member has a laterally extending shoulder, a central bore, and a counterbore sized to retain the head of the screw, which counterbore forms an internal rim which overlays the hub of the lower pin member;

the rotatable joint between the upper and lower pin members is formed between a lower surface of the rim and an upper surface of the hub; and the detents are formed between projections on one of the rim or hub and recesses on the other of the rim and hub for alternately holding the shoulders in the first and second modes.

9. The end pin of claim 8, wherein a spring is situated between the head of the screw and the upper pin member, whereby when the screw is threaded into the body the head of the screw loads the spring against the upper pin member and biases the detents toward engagement between the upper and lower pin members.

* * * * *